March 4, 1958

J. W. JACOBS 2,825,233

DRIVE MECHANISM FOR REFRIGERATING APPARATUS

Filed April 1, 1955

INVENTOR.
James W. Jacobs
BY
R R Caudor
His Attorney

March 4, 1958     J. W. JACOBS     2,825,233
DRIVE MECHANISM FOR REFRIGERATING APPARATUS
Filed April 1, 1955     4 Sheets-Sheet 2
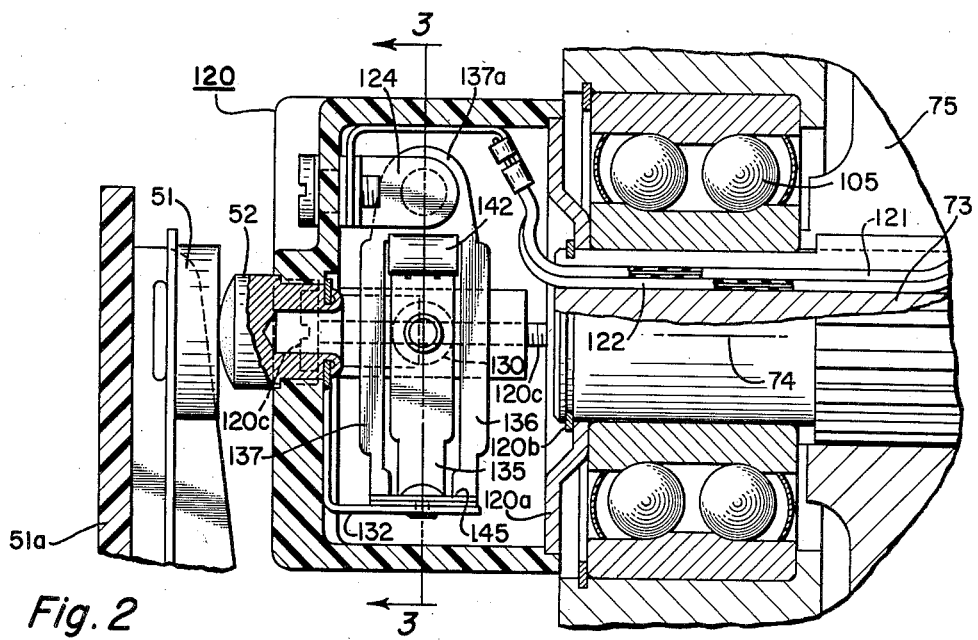
Fig. 2
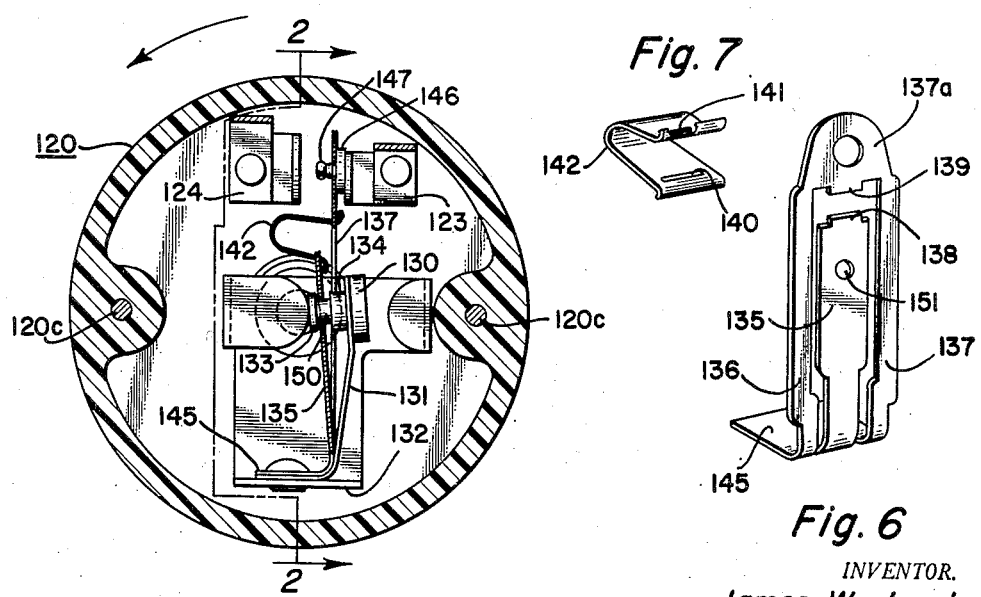
Fig. 3
Fig. 7
Fig. 6
INVENTOR.
James W. Jacobs
BY
His Attorney March 4, 1958  J. W. JACOBS  2,825,233
DRIVE MECHANISM FOR REFRIGERATING APPARATUS
Filed April 1, 1955  4 Sheets-Sheet 3

INVENTOR.
James W. Jacobs
BY
His Attorney

March 4, 1958     J. W. JACOBS     2,825,233
DRIVE MECHANISM FOR REFRIGERATING APPARATUS
Filed April 1, 1955     4 Sheets-Sheet 4

INVENTOR.
James W. Jacobs
BY
His Attorney

United States Patent Office 2,825,233
Patented Mar. 4, 1958

2,825,233

DRIVE MECHANISM FOR REFRIGERATING APPARATUS

James W. Jacobs, Dayton, Ohio, assignor to General Motors Corporation, Detroit, Mich., a corporation of Delaware Application April 1, 1955, Serial No. 498,598

10 Claims. (Cl. 74—336.5)

This invention relates to refrigerating apparatus and more particularly to a multiple speed clutch mechanism for driving, for example, a compressor of a refrigerating system to condition the air within a passenger car compartment or the like.

An object of this invention is to provide a multiple speed clutch which is selectively locked in a plurality of speed ratios by a plurality of solenoids selectively controlled by a centrifugal multiple-way switch mounted on the shaft of the clutch.

Another object of this invention is to provide a multiple speed clutch which is selectively locked in a plurality of speed ratios by a plurality of solenoids selectively controlled by a centrifugal multiple-way switch mounted on the shaft of the clutch and having an electric contactor button at the end of said shaft and rotating with said shaft.

Another object of this invention is to provide a multiple speed clutch having multiple speed solenoids secured to the shaft of the clutch and rotating therewith and selectively locking the clutch in multiple speed drives by the action of teaser disks serving as magnetic armatures to be moved axially by the solenoids into engagement with the solenoids thereby causing locking engagement of the clutch.

Another object of this invention is to provide a centrifugal switch mounted on a shaft with a contactor button on the end of the shaft cooperating with a stationary contactor substantially at the axis of the shaft.

Another object of this invention is to provide a centrifugal switch with a lost motion connection between the centrifugal weight and a snap switch element.

Further objects and advantages of the present invention will be apparent from the following description, reference being had to the accompanying drawings wherein a preferred form of the invention is clearly shown.

In the drawings:

Figure 2 is an enlarged cross-section taken substantially along the line 2—2 of Figure 3, and showing details of the centrifugal switch.

Figure 3 is a cross-section taken along the line 3—3 of Figure 2.

Figure 6 is a perspective of the snap acting blades in the switch mechanism.

Figure 7 is a perspective of the C-spring used in connection with the blades of Figure 6.

Figures 1, 8:
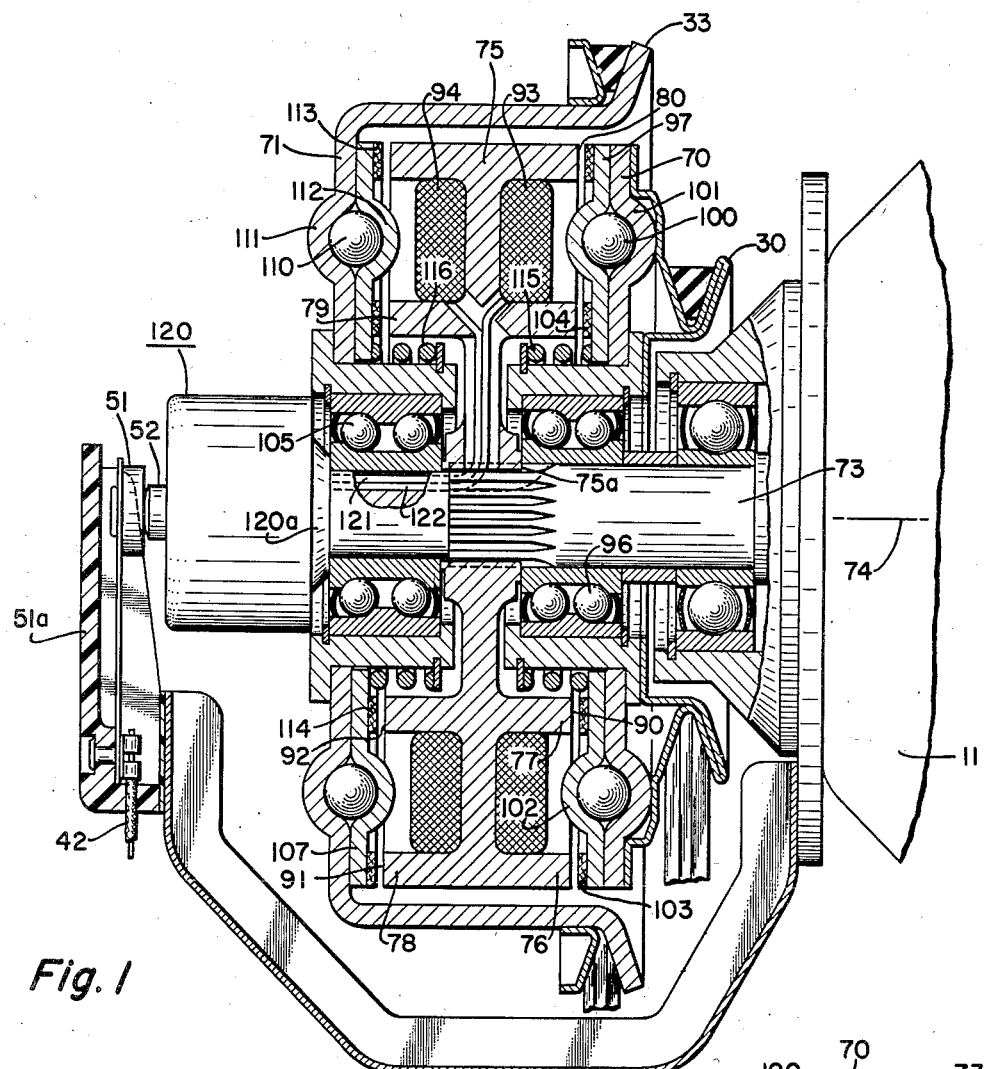
Figure 1 is a vertical, longitudinal cross-section of the clutch mechanism.
Figure 8 is an exploded, diagrammatic view of parts of the clutch.

The clutch mechanism is used, for example, in a drive between the automobile engine 10 (Fig. 4) of a passenger car and the compressor 11 of a refrigerating system for conditioning the passenger compartment or other compartment in a car or truck. The construction is such that when the engine 10 is operating at a relatively slow speed, the high speed ratio drive of the clutch is locked, to drive the compressor at a relatively high ratio speed compared with the speed of the engine. On the other hand, when the engine 10 is operating at a relatively high speed, then the low speed ratio of the clutch mechanism is locked to drive the compressor 11 at relatively low speed ratio compared with the speed of the engine. In this manner, the speed of the compressor is maintained within closer limits than the speed limits of the engine, to prevent excessively high or low speeds of the compressor.

The automobile engine 10 has a drive shaft 12 to which are fixed belt pulleys 13, 14 and 15, driving the belts 16, 17 and 18. The belt 16 drives the pulley 19 fixed on the shaft 20 of the water pump 21 to circulate the water in the engine cooling system. The belt 16 also drives the pulley 22 fixed on the shaft 23 of the power steering pump 24. The belt 17 drives the pulley 25 fixed on the shaft 26 of the generator 27. The belt 17 also rides over the pulley 28 also fixed on the shaft 20 of the water pump 21 and the radiator fan 29. The belt 17 also drives the high speed ratio pulley 30 of the clutch mechanism more fully hereafter described.

The belt 18 rides over the pulley 31 fixed on the shaft 26 and over the pulley 32 fixed on the shaft 20. In addition, it drives the low speed ratio pulley 33 of the clutch mechanism hereafter to be more fully described.

Figure 4:
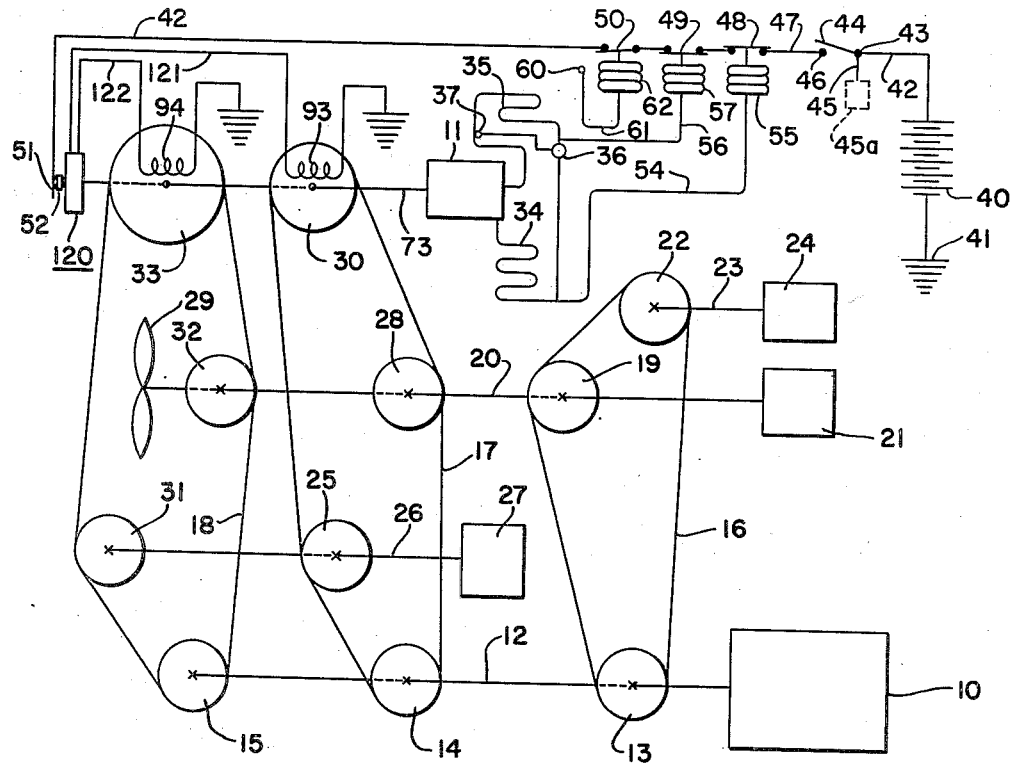
Figure 4 is a diagrammatic representation of the driving mechanism and the refrigerating system, as used in an automobile.
Figure 5:
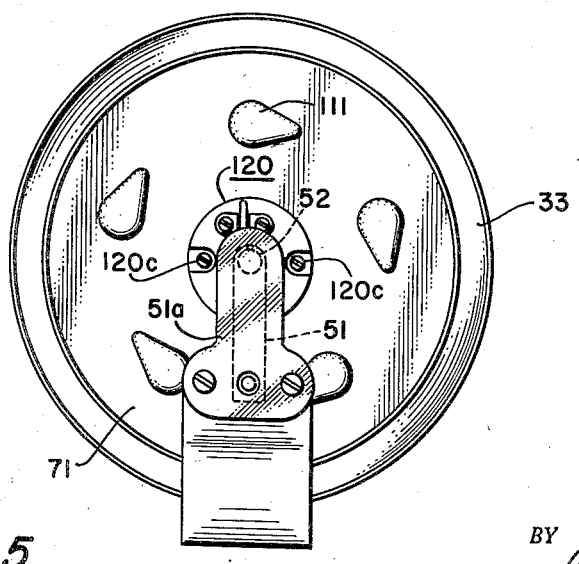
Figure 5 is an end view, on a reduced scale, of the clutch mechanism.

Figure 4 also shows the refrigerating system which includes the compressor 11, condenser 34, evaporator 35 and thermostatic expansion valve 36, having the usual thermostatic bulb 37 adjacent the outlet end of the evaporator 35. The electrical system of the automobile includes a battery 40 grounded at 41 and having a lead 42 which leads to the junction 43 feeding the air conditioning switch 44 and the lead 45 connected to other usual parts of the automobile electrical system, generally indicated by dotted rectangle 45a, and which may include the ignition system, and the charging connections between the battery 40 and the generator 27, as well as any other electrical parts of the car. The manual air conditioning switch 44 closes on the contact 46 to energize the line 47 which includes the switches 48, 49 and 50 in series with the electric stationary input contactor 51, which feeds current to the rotating electric input contactor button 52 for operating the clutch mechanism in a manner to be more fully described.

The refrigerating system may be connected to the switches 48, 49 and 50 to modify the operation of the clutch mechanism. Switch 48 is a refrigerant high pressure switch connected by the line 54 with the condenser portion of the refrigerating system and to the bellows 55. When refrigerant pressures on the high side are excessively great, the operation of the compressor is stopped by the opening of switch 48. The switch 49 is a refrigerant low pressure switch connected by the line 56 with the evaporator portion of the refrigerating system and also with the bellows 57. The switch 49 opens when the refrigerant pressures on the low side fall below a predetermined or freezing limit and stop the operation of the compressor. The switch 50 is responsive to temperatures within the passenger compartment through the medium of thermostat 60 in the passenger compartment connected through the line 61 and bellows 62 to open the switch 50 when passenger compartment temperatures are below the desired low predetermined limit and to close the switch 50 when the temperature of the compartment is above the desired high predetermined limit and thus govern the operation of the compressor in response to compartment temperatures. The thermostat switch 60, as well as the other switches 48 and 49 may be adjustable by the user in any well known manner.

The pulleys 30 and 33 heretofore described are part of the variable clutch mechanism shown in the other figures of the drawings. Referring now particularly to Figure 1, the high speed ratio pulley 30 is secured to the high speed driving disk 70. The low speed ratio pulley 33 is secured to the low speed driving disk 71. The disks 70 and 71 are selectively drivingly locked by the magnetic construction now to be described.

The compressor 11 has a driven shaft 73 with a shaft axis 74. A magnetic disk 75 surrounds and is secured to the shaft 73 by splines 75a and has oppositely directed high speed double pole rings 76, 77, and low speed double pole rings 78, 79 providing respectively high speed and low speed magnetic teaser surfaces 80, 90, 91 and 92. A high speed solenoid 93 is mounted on one side of the magnetic disk 75 within the high speed double pole rings 76 and 77, and this solenoid magnetically energizes the high speed double pole rings. A low speed solenoid 94 is mounted on the other side of the magnetic disk 75 and is within and energizes the low speed double pole rings 78 and 79. The high speed driving disk 70 is adjacent to the high speed double pole rings 76 and 77 and has a relative rotation bearing 96 with the shaft 73, this preferably being a ball bearing of usual construction. The ball bearing 96 also axially locks one side of the magnetic disk 75, as shown. A combined high speed teaser and armature disk 97 is loosely mounted between the high speed driving disk 70 and the high speed double pole rings 76 and 77. Relative rotation reaction locking means are placed between the armature disk 97 and the high speed driving disk 70, and such locking means may take the form of balls 100 and teardrop or wedge groove constructions 101 and 102 so constructed that relative rotation between the disks drivingly locks them together, when the armature disk 97 is pulled into contact with the double pole rings 76 and 77. The relative rotation drive is enhanced by the friction disks 103 and 104.

The low speed driving disk 71 is adjacent to the low speed double pole rings 78 and 79 and surrounds and has a relative rotation bearing 105 with the shaft 73, the bearing preferably being of the ball bearing type. The bearing 105 axially locks the magnetic disk 75 on the shaft 73, as shown. A combined low speed teaser and armature disk 107 is loosely mounted between the low speed driving disk 71 and the low speed double pole rings 78 and 79. Relative rotation reaction locking means are placed between the low speed teaser and armature disk 107 and the low speed driving disk 71. Such locking means may take the form of balls 110 and teardrop or wedge groove constructions 111 and 112 to lock the disks together when the armature disk 107 is pulled against the low speed double pole rings 78 and 79, the drive being enhanced by the friction disks 113 and 114.

The armature disk 97 is normally urged away from the rings 76 and 77 by the coil spring 115. The armature disk 107 is normally urged away from the double pole rings 78 and 79 by the coil spring 116. The actions of the springs 115 and 116 are overcome by the selective energization of the solenoids 93 and 94, which selective energization is accomplished by means now to be described.

The means selectively to energize the solenoids 93 and 94 may include a centrifugal two-way switch 120 (Figures 2, 3, 6 and 7) mounted on the shaft 73 and rotating therewith and having electric connections 121 and 122 with the solenoids 93 and 94 selectively to energize the solenoids. The leads 121 and 122 are connected to the terminals 123 and 124 mounted within the switch structure 120.

The rotating electric input contactor button 52 is mounted on the switch 120 in alignment with the axis 74 of the shaft 73. The stationary electric input contactor 51 is in contact with the button 52 substantially on the shaft axis 74. The contactor 51 is a flexible blade mounted on the base 51a carried by any convenient part of the compressor.

The switch construction 120 has a centrifugal two-way snap switch mechanism mounted on the shaft 73 having electric connections with the solenoids through the medium of contacts 123 and 124.

The centrifugal switch 120 may include a centrifugal weight 130 mounted on a resilient blade 131 which is secured to the frame 132, which frame is carried by and is secured to the shaft 73 through the medium of button 52, casing 120 and plate 120a, secured to the shaft 73 by split ring 120b, for example. The casing 120 is secured to plate 120a by screws 120c.

The centrifugal weight 130 has a lost motion connection 133, 134 with the inner blade 135. The blade 135 is within the two arms 136 and 137 of an outer blade 137a. The blades 135 and 137a have tongues 138 and 139. The tongues 138 and 139 are placed within the slots 140 and 141 of the C-spring 142 to cause the blade 135 to snap in an opposite direction from the blade 137a. These blades are secured to and are integral with the base portion 145 which is mounted on the frame 132 heretofore described.

The blade 137a has contacts 146 and 147 which engage the terminals 123 and 124 selectively to transmit current from the button 52 to the solenoids 93 and 94, in response to the speed of the shaft 73 by the action of the centrifugal weight 130. The lost motion 133, 134 prevents an undue hunting action of the switch and causes it to return to first position at a lower shaft speed during deceleration than the predetermined down shaft speed limit on accleration. The lost motion connection includes the buttons 133 and 134 joined by a shaft 150 passing through the opening 151 in the blade 135.

If desired, the centrifugal switch may be of the character disclosed in the concurrently filed application of James W. Jacobs and Donald L. Coning for Refrigerating Apparatus, S. N. 498,678 filed April 1, 1955, now Patent No. 2,762,229 dated Sept. 11, 1956.

In the operation of the device, when the engine 10 is operating at relatively low speed, the centrifugal switch 120 energizes the high speed solenoid 93, and this causes the clutch mechanism to drive the compressor shaft 73 at relatively high speed ratio as compared with the engine speed 10. On the other hand, when the engine 10 is operating at relatively high speed, the switch 120 selectively energizes the low speed solenoid 94 and thus causes the shaft 73 to be driven at relatively slow speed as compared with the speed of the engine 10. The up shift occurs at a lower shaft speed, due to lost motion 150. The temperature of the passenger compartment effects the thermostat 60 and opens and closes the switch 50 to drive the compressor 11 when the passenger compartment temperature is above a predetermined limit and to stop the compressor when the temperature is below a predetermined limit. The switch 49 stops the compressor if the low side refrigerant pressure drops below a safe or freezing limit. The switch 48 stops the compressor if the refrigerant pressure on the high side rises above a predetermined limit.

Energization of the high speed solenoid 93 pulls the armature disk 97 leftward in Figure 1 and causes relative rotation between the disks 70 and 97, and this causes a locking engagement through the medium of balls 100 and teardrops 101 and 102 which produces a direct and positive drive from the high speed pulley 30 through the disks 70 and 97 and magnetic disk 75 to the shaft 73. Deenergization of solenoid 93 permits the spring 115 to move the disk 97 away from the magnetic disk 75 and thus terminates the positive drive from the high speed pulley 30. Energization of the low speed solenoid 94 pulls the armature disk 107 rightward in Figure 1 and causes relative rotation between the disks 71 and 107 and causes positive locking engagement between the disks through the medium of balls 110 and teardrops 111 and 112. This produces a positive drive from the low speed ratio pulley 33 to the shaft 73 through disks 71, 107 and magnetic disk 75. Deenergization of the solenoid 94 permits the spring 116 to move teaser disk 107 away from disk 75 and thus terminate the positive drive from the low speed ratio disk 33. Deenergization of both solenoids 93 and 94, as by the opening of any of switches 44, 48, 49 and/or 50 completely declutches shaft 73 and stops the compressor.

Figure 9:
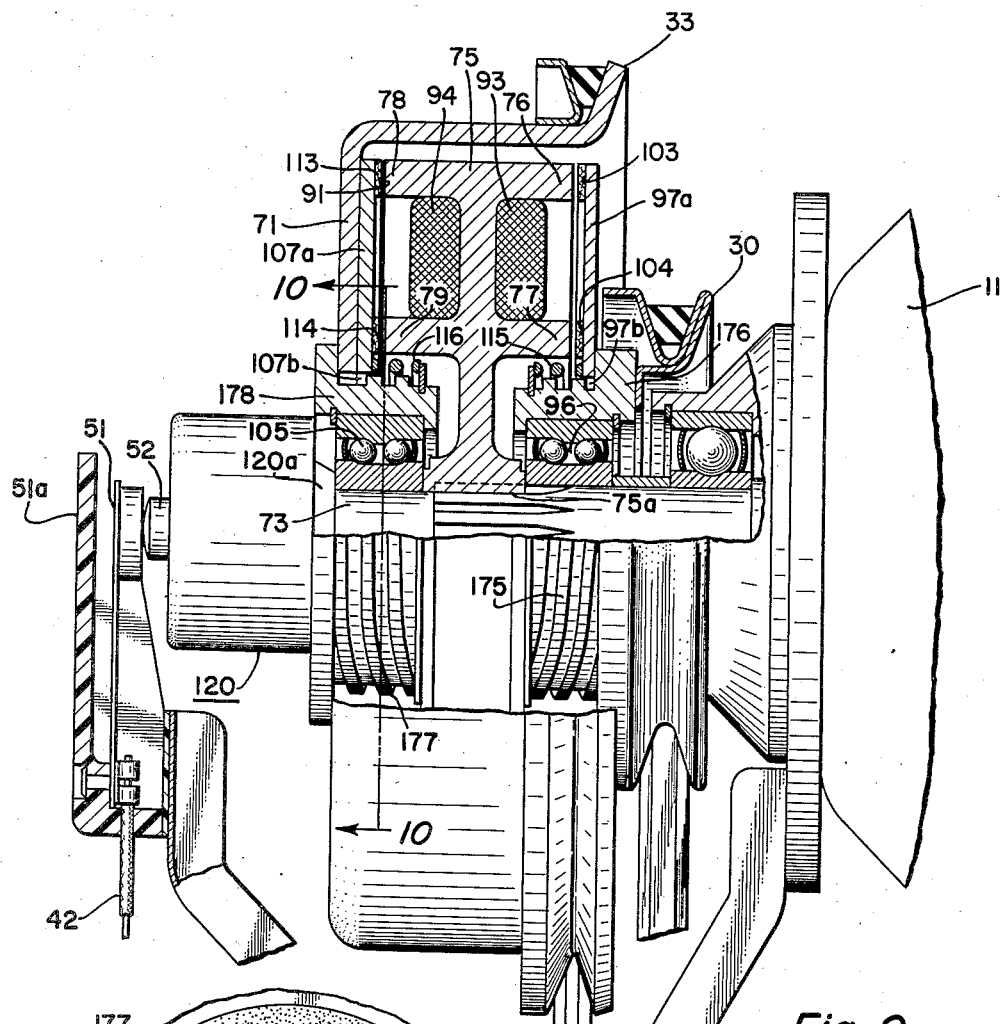
Figure 9 is a side view, partly in cross-section, of a modified form.
Figure 10:
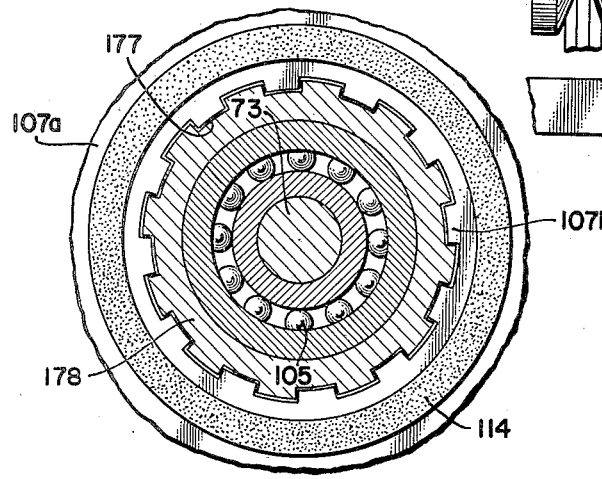
Figure 10 is a view along line 10—10 of Figure 9.

The clutch shown in Figures 9 and 10 uses a different relative rotation locking means in lieu of the ball and teardrop construction of the previous figures.

The parts of the clutch of Figures 9 and 10 which are substantially the same as in the previous figures have been identified by the same numerals, and it is understood that such parts operate and are controlled in the same manner, and hence are not now described.

The relative rotation locking means of Figures 9 and 10 include the armature disks 97a and 107a, which are attracted by solenoids 93 and 94 and are actuated by springs 115 and 116 substantially as in the previous modification.

However, the armature disk 97a has fingers 97b which ride in the spiral grooves 175 formed on the hub 176 to which the high speed pulley 30 is secured. The spiral 175 is in the direction whereby a tighter grip is produced between poles 76, 77 and the friction faces 103 and 104 when relaive rotation is produced between disk 97a and hub 176 when solenoid 93 is energized.

The armature disk 107a is likewise provided with fingers 107b which ride in spiral grooves 177 formed in hub 178 to which the low speed pulley 33 is secured. The spiral 177 is in the direction whereby a tighter grip is produced between poles 78, 79 and friction faces 113 and 114 when relative rotation is produced between disk 107a and hub 178 when solenoid 94 is energized. Operation of the modification in Figures 9 and 10 is substantially the same as in the previous modification. Selective energization of either solenoid 93 or 94 by switch 120 magnetically attracts the corresponding armature 97a or 107a, and the subsequent relative rotation induced between such armature and its corresponding hub 176 or 178 produces a positive drive from the selected pulley 30 or 33 to the driven shaft 73 of the compressor.

While the form of embodiment of the invention as herein disclosed constitutes a preferred form, it is to be understood that other forms might be adopted as may come within the scope of the claims which follow.

What is claimed is as follows:

1. In combination: a shaft having a shaft axis; a magnetic disk surrounding and secured to said shaft and having oppositely directed high speed and low speed double pole rings providing respectively high speed and low speed magnetic teaser surfaces; a high speed solenoid on one side of said magnetic disk to energize said high speed double pole ring; a low speed solenoid on the other side of said magnetic disk to energize said low speed double pole ring; a high speed driving disk adjacent said high speed double pole ring surrounding and having a relative rotation bearing with said shaft; a combined high speed teaser and armature disk loosely mounted between said high speed driving disk and said high speed double pole ring; relative rotation reaction locking means between said armature disk and said high speed driving disk; a low speed driving disk adjacent said low speed double pole ring surrounding and having a relative rotation bearing with said shaft; a combined low speed teaser and armature disk loosely mounted between said low speed driving disk and said low speed double pole ring; relative rotation reaction locking means between said low speed teaser and armature disk and said low speed driving disk; and means selectively to energize said solenoids.

2. In combination: a shaft having a shaft axis; a magnetic disk surrounding and secured to said shaft and having oppositely directed high speed and low speed double pole rings providing respectively high speed and low speed magnetic teaser surfaces; a high speed solenoid on one side of said magnetic disk to energize said high speed double pole ring; a low speed solenoid on the other side of said magnetic disk to energize said low speed double pole ring; a high speed driving disk adjacent said high speed double pole ring surrounding and having a relative rotation bearing with said shaft; a combined high speed teaser and armature disk loosely mounted between said high speed driving disk and said high speed double pole ring; relative rotation reaction locking means between said armature disk and said high speed driving disk; a low speed driving disk adjacent said low speed double pole ring surrounding and having a relative rotation bearing with said shaft; a combined low speed teaser and armature disk loosely mounted between said low speed driving disk and said low speed double pole ring; relative rotation reaction locking means between said low speed teaser and armature disk and said low speed driving disk; and means responsive to the speed of said shaft selectively to energize said solenoids.

3. In combination: a shaft having a shaft axis; a magnetic disk surrounding and secured to said shaft and having oppositely directed high speed and low speed double pole rings providing respectively high speed and low speed magnetic teaser surfaces; a high speed solenoid on one side of said magnetic disk to energize said high speed double pole ring; a low speed solenoid on the other side of said magnetic disk to energize said low speed double pole ring; a high speed driving disk adjacent said high speed double pole ring surrounding and having a relative rotation bearing with said shaft; a combined high speed teaser and armature disk loosely mounted between said high speed driving disk and said high speed double pole ring; relative rotation reaction locking means between said armature disk and said high speed driving disk; a low speed driving disk adjacent said low speed double pole ring surrounding and having a relative rotation bearing with said shaft; a combined low speed teaser and armature disk loosely mounted between said low speed driving disk and said low speed double pole ring; relative rotation reaction locking means between said low speed teaser and armature disk and said low speed driving disk; and a centrifugal two-way switch mounted on said shaft and having electric connections with said solenoids selectively to energize said solenoids.

4. In combination: a shaft having a shaft axis; a magnetic disk surrounding and secured to said shaft and having oppositely directed high speed and low speed double pole rings providing respectively high speed and low speed magnetic teaser surfaces; a high speed solenoid on one side of said magnetic disk to energize said high speed double pole ring; a low speed solenoid on the other side of said magnetic disk to energize said low speed double pole ring; a high speed driving disk adjacent said high speed double pole ring surrounding and having a relative rotation bearing with said shaft; a combined high speed teaser and armature disk loosely mounted between said high speed driving disk and said high speed double pole ring; relative rotation reaction locking means between said armature disk and said high speed driving disk; a low speed driving disk adjacent said low speed double pole ring surrounding and having a relative rotation bearing with said shaft; a combined low speed teaser and armature disk loosely mounted between said low speed driving disk and said low speed double pole ring; relative rotation reaction locking means between said low speed teaser and armature disk and said low speed driving disk; a centrifugal two-way switch mounted on said shaft and having electric connections with said solenoids selectively to energize said solenoids; a rotating electric input contactor button on said switch in alignment with said axis; and a stationary electric input contactor in contact with said contactor button substantially at said axis.

5. In combination: a shaft having a shaft axis; a high multiple speed clutch means including a high speed magnetic clutch and a low speed magnetic clutch selectively driving said shaft at relatively high and low speeds; high and low speed solenoids for selectively locking each clutch; and a centrifugal two-way switch mounted on said shaft and having electric connections with said solenoids selectively to control said solenoids.

6. In combination: a shaft having a shaft axis; multiple speed clutch means including a high speed magnetic clutch and a low speed magnetic clutch selectively driving said shaft at relatively high and low speeds; high and low speed solenoids for selectively locking each clutch; a centrifugal two-way switch mounted on said shaft and having electric connections with said solenoids selectively to control said solenoids; a rotating electric input contactor button on said switch in alignment with said axis; and a stationary electric input contactor in contact with said contactor button substantially at said axis.

7. In combination: a shaft having a shaft axis; a high speed magnetic clutch and a low speed magnetic clutch selectively driving said shaft at relatively high and low speeds; high and low speed solenoids for selectively locking each clutch; and a centrifugal two-way snap switch mounted on said shaft and having electric connections with said solenoids selectively to control said solenoids.

8. In combination: a shaft having a shaft axis; a high speed magnetic clutch and a low speed magnetic clutch selectively driving said shaft at relatively high and low speeds; high and low speed solenoids for selectively locking each clutch; a centrifugal two-way snap switch mounted on said shaft and having electric connections with said solenoids selectively to control said solenoids; a rotating electric input contactor button on said switch in alignment with said axis; and a stationary electric input contactor in contact with said contactor button substantially at said axis.

9. In combination, a shaft having a shaft axis, two separate electrical loads mounted on said shaft for rotation therewith, and a centrifugal two-way snap acting switch mounted on said shaft having a voltage input terminal and having direct electrical connections with said loads, said switch being actuated at one predetermined speed to connect one of said electrical loads with said voltage input terminal and being actuated at a second predetermined speed to connect the other of said loads with said voltage input terminal.

10. In combination, a shaft having a shaft axis, two separate electrical loads mounting on said shaft for rotation therewith, a centrifugal two-way snap acting switch mounted on said shaft having a voltage input terminal and having direct electrical connections with said loads, and a stationary electrical input contactor in contact with said input terminal at said axis, said switch being actuated at one predetermined speed to connect one of said electrical loads with said voltage input terminal and being actuated at a second predetermined speed to connect the other of said loads with said voltage input terminal.

References Cited in the file of this patent

UNITED STATES PATENTS

| | | |
|---|---|---|
| 1,671,057 | Brainard | May 22, 1928 |
| 2,115,097 | Durham | Apr. 26, 1938 |
| 2,234,309 | Kromholz | Mar. 11, 1941 |
| 2,421,213 | Moody | May 27, 1947 |